United States Patent [19]

Tanaka

[11] Patent Number: 4,799,805
[45] Date of Patent: Jan. 24, 1989

[54] FOUR TRACK-TYPE ENDLESS RECTILINEAR MOTION GUIDE UNIT

[75] Inventor: Kazuhiko Tanaka, Fuchu, Japan
[73] Assignee: Nippon Thompson Co. Ltd., Tokyo, Japan
[21] Appl. No.: 178,027
[22] Filed: Apr. 5, 1988
[30] Foreign Application Priority Data Dec. 28, 1987 [JP] Japan .................................. 62-330195

[51] Int. Cl.⁴ ............................................. F16C 31/06
[52] U.S. Cl. ......................................... 384/44; 384/45
[58] Field of Search ............................ 384/43, 44, 45; 464/168

[56] References Cited

U.S. PATENT DOCUMENTS 3,008,774 11/1961 Morris et al. ......................... 384/45
4,563,045 1/1986 Katayama ............................. 384/44
4,743,124 5/1988 Blaurock .............................. 384/45

FOREIGN PATENT DOCUMENTS 0000622 1/1983 Japan ................................... 384/44

*Primary Examiner*—Stuart S. Levy
*Assistant Examiner*—Thomas R. Hannon
*Attorney, Agent, or Firm*—Rogers & Killeen

[57] ABSTRACT

A four track-type endless rectilinear motion guide unit is provided wherein a slide unit is mounted on a track rail member with a plurality of parallel-arranged cylindrical rollers being intervened therebetween for endless circulation. The four endless circulation passages for rollers, viz., a pair of lower and upper passages on each of the opposing sides of the slide unit, viz., opposing sidewalls of the trackway members are arranged such that as seen in a cross section of the slide unit, their longitudinal axes cross each other at right angles, while the longitudinal lengths of the two endless circulation passages differ from each other so that the longer circulation passage encompasses the shorter circulation passage within the loop, but the lengths of the load carrying trackway surfaces of said two circulation passages are the same.

Thus is provided a four track-type endless rectilinear motion guide unit wherein the construction of the slide unit is particularly made simple and compact, while the load capacities of the respective trackways are made equally balanced, yet minimizing the longitudinal length, as a whole, of the endless circulation passages to be formed in the slide unit.

3 Claims, 7 Drawing Sheets

FOUR TRACK-TYPE ENDLESS RECTILINEAR MOTION GUIDE UNIT

BACKGROUND OF THE INVENTION

1. Field of the Invention

The present invention relates to an endless rectilinear motion guide unit, wherein a pair of lower and upper load-carrying trackways are formed on each side of a track rail member, viz., four trackways in all on both sides thereof and, on the inner sidewall of a slide unit are also formed the corresponding number of lower and upper load-carrying trackways for mating in position with said four load-carrying trackways of the track rail member, so that the slide unit, upon having been assembled in straddling relation with said track rail member with a plurality of cylindrical rollers being arranged in parallel with one another between the mating trackways, can freely and rectilinearly move on said track rail member.

In more details, the present invention provides an endless rectilinear motion guide unit wherein two endless circulation passages are provided in each of the opposing sides of the slide unit, which are so arranged, as seen in a cross section thereof, that their longitudinal axes cross each other at right angles, while the longitudinal lengths of the two endless circulation passages differ from each other such that the longer circulation passage encompasses the shorter circulation passage within the loop, but the lengths of the load-carrying trackway surfaces of said two circulation passages are the same.

2. Prior Arts

German utility model application No. 1971845 and Japanese patent application publication No. 24646-1987 each disclose an endless rectilinear motion guide unit having four trackways along and through which a plurality of parallel-arranged cylindrical rollers move.

However, the prior units have the following inherent disadvantages:

In case of the German utility model, for example, two endless circulation passages are formed on each side of the slide unit, which are so arranged that one encompasses the other but due to the difference in length of the two passages, load capacities thereof differ from each other as the result with the shorter one having shorter effective life, so that the prior art unit can find only limited utility.

Furthermore, in case of the Japanese patent application, two endless circulation passages are provided in each of the opposing sides of the slide unit, which are linked each other like a chain so that through the load-carrying trackways of the two passages are the same in length, the longitudinal length as a whole of the associated endless circulation passages becomes greater, inevitably resulting in an enlargement of the unit as a whole.

SUMMARY OF THE INVENTION

The object of the present invention therefore is to provide a four track-type endless rectilinear motion guide unit wherein the above-mentioned disadvantages of the prior art units can be eliminated, while load capacities of the respective load-carrying trackways are made equally balanced, yet minimizing the longitudinal length, as a whole, of the endless circulation passages to be formed in the slide unit.

Further object of the present invention is to provide a four track-type endless rectilinear motion guide unit wherein the construction of the slide unit is particularly made simple and compact, consisting of the least possible number of parts, while eliminating any assembly error and thus obtaining high precision units.

According to the endless rectilinear motion guide unit of the present invention, a pair of lower and upper load-carrying trackways are formed on each of the opposing inner sidewalls of a slide unit, more specifically of the opposing inner sidewalls of an inner recess having an inverted U-shaped cross section provided underside thereof so that four trackways in all are formed on both the inner sidewalls with said pair of load-carrying trackways on the same side forming parts of two endless circulation passages provided in each of the opposing sides of the slide unit, and said two endless circulation passages, as seen in a cross section thereof, being so arranged that their longitudinal axes cross each other at right angles, while the longitudinal lengths of the two endless circulation passages differ from each other such that the longer circulation passage encompasses, within the loop, the shorter circulation passages, but the lengths of the load-carrying trackway surfaces of said two circulation passages are made the same.

DESCRIPTION OF THE PREFERRED EMBODIMENTS

Figure 1:
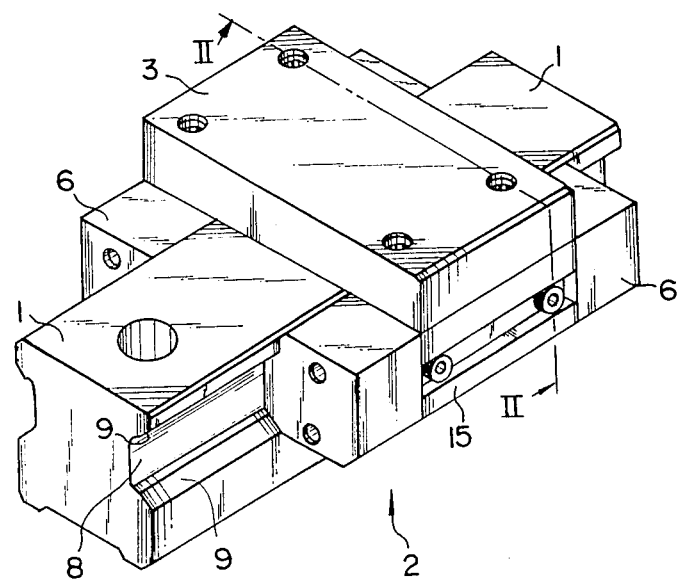
FIG. 1 is a perspective view showing the whole appearance of the first embodiment of the present invention.

Referring to FIG. 1, a slide unit 2 having a generally an inverted U-shaped cross section straddles with its recess having an inverted U-shaped cross section 7 on an elongated rod-shaped track rail member 1 having a generally I-shaped cross section with a plurality of parallelarranged cylindrical rollers being intervened between said track rail member 1 and slide unit 2.

Referring to FIG. 1, on each side of the track rail member 1 is formed a longitudinally extending groove 8 defining a pair of load carrying trackway surfaces 9 at and along the laterally opposing edge portions thereof which are inclined in themselves at an angle of 45° symmetrical to said groove 8.

Figure 2:
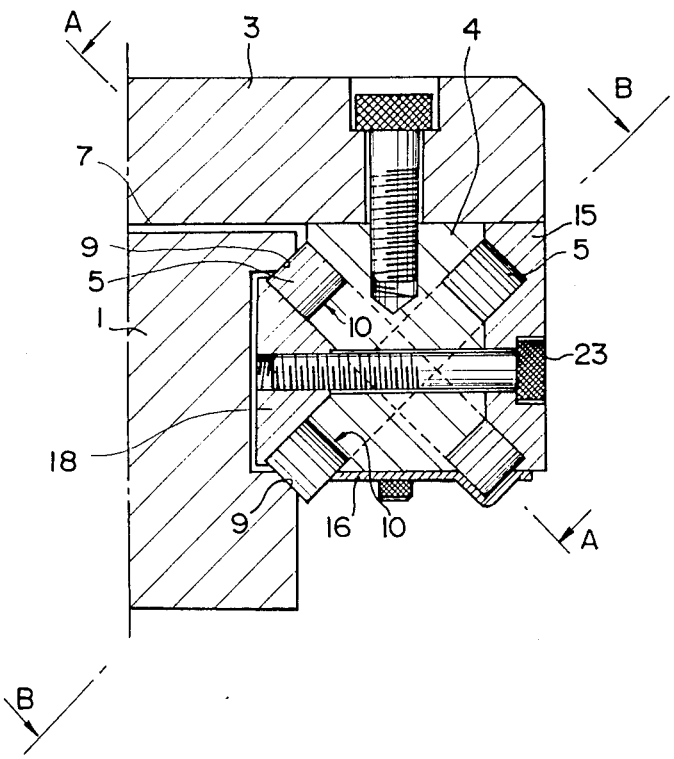
FIG. 2 is a cross-sectional elevation of the right half of the present unit taken along line II—II on FIG. 1.
Figure 6:
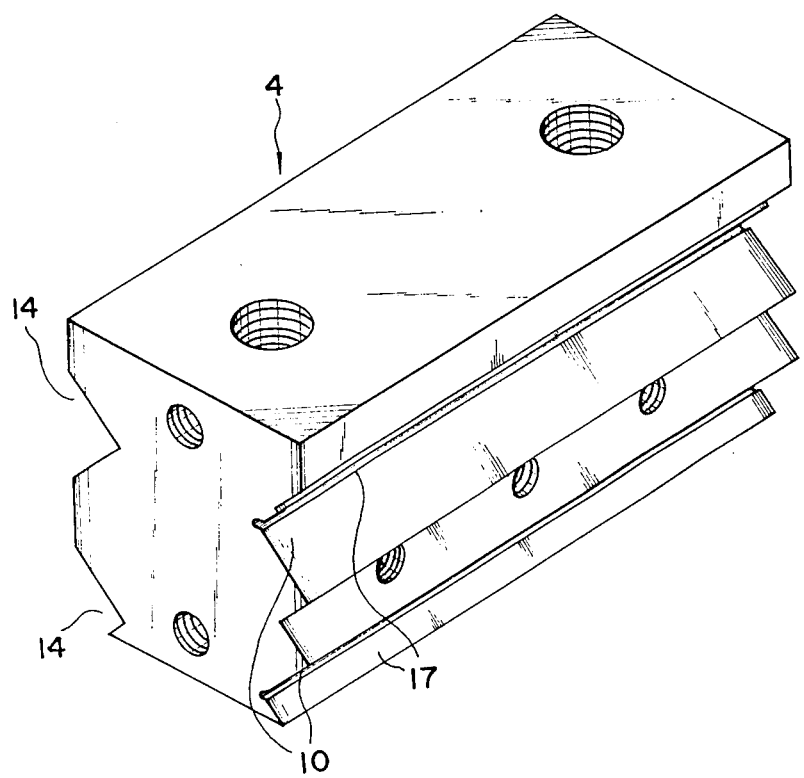
FIG. 6 is a perspective view of the trackway member that forms part of the slide unit according to the first embodiment of the present invention.

The slide unit 2, as shown in FIG. 2, consists of a casing 3 forming the upper part thereof and a pair of leg-shaped trackway members 4 depending from the opposing end portions of said casing 3 as shown in the perspective view of FIG. 6, thus defining thereunder a recess 7 having an inverted U-shaped cross section between said pair of trackway members 4 with which the slide unit 2 straddles on the track rail member 1 as shown in FIG. 1.

The slide unit 2, in more details, further consists of a pair of sidewall retainers 18 each adapted to be fitted onto the inner sidewall of the trackway member 4 (FIG. 2 and FIG. 7), bottom wall retainer 16 and side panel 6 both of which are adapted to be fitted onto the bottom and sidewalls, respectively, of each of the trackway member 4 (FIGS. 1, 3 and 4) and return passage covers 15 to be fitted onto the opposing outer wall of the trackway member 4 so that the rollers enclosed in the respective endless circulation passages formed in the slide unit do not fall off therefrom with the aid of said bottom wall retainer 16 and sidewall retainer 18, even if the slide unit 3 is removed from the track rail member 1.

Facing the rail-side trackway surfaces 9 are formed trackway surfaces 10 on the innerwall surface of the inner recess 7 of the slide unit 2, more specifically, of each of the trackway members 4 as shown in FIGS. 2 and 6, thereby to form load-carrying trackways for rollers between the rail side trackway surfaces 9 and slide unit side trackway surfaces 10. These load-carrying trackways each form part of the endless circulation passage formed in the slide unit 2 as shown in FIGS. 2, 3 and 4, which together with a pair of direction changing passages (11' or 12') connecting the opposing ends of the load-carrying trackway portion and a return passage connecting the ends of the direction changing passages, can form a complete endless circulation passage.

Figure 3:
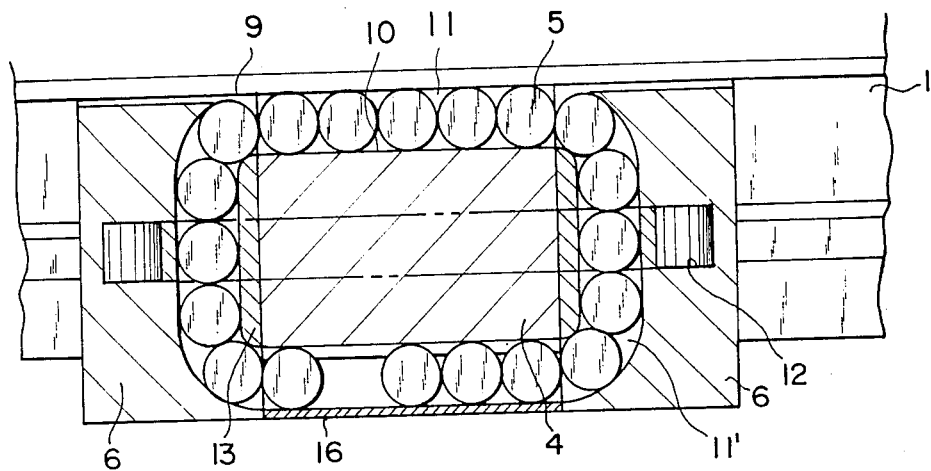
FIG. 3 is a cross section as seen from the direction indicated by arrow lines A—A on FIG. 2, showing a shorter endless circulation passage.
Figure 4:
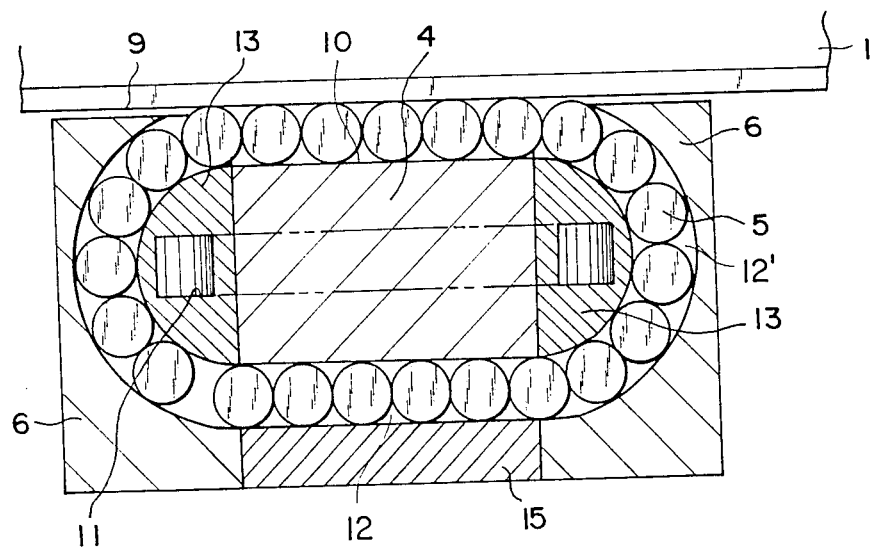
FIG. 4 is a cross section as seen from the direction indicated by arrow lines B—B on FIG. 2, showing a longer endless circulation passage.

In FIG. 3 is shown the shorter endless circulation passage 11 as seen from the direction indicated by arrow lines A—A in FIG. 2, including opposing direction changing passages 11' each consisting of a curved portion and adjoining straight portions thereby reducing the longitudinal length of the shorter endless circulation passage 11 as a whole, so that the shorter endless circulation passage 11 can be completely encompassed within the loop of the longer endless circulation passage 12 including the direction changing passages 12' each consisting of a single semicircular arc portion, yet the longitudinally extending straight portions of both the endless circulation passages 11 and 12 as well as the lower and upper load-carrying trackways can be made equal in length, each of which is formed by the mating rail-side trackway surface 9 and slide unit-side trackway surface 10 shown in FIG. 3 and FIG. 4. Thus, a four track-type endless rectilinear motion guide unit can be provided with endless circulation passages each having not only the same load capacity but also a shorter longitudinal length as a whole.

FIG. 2 is a cross section of the right half of the present unit taken along line II—II on FIG. 1, and FIG. 6 is a perspective view of the trackway member 4, each illustrating the shape in details thereof. On both the longitudinally extending sides of the trackway member 4 are formed a plurality of right angle V-shaped grooves, wherein the inner sidewall of the trackway member 4 has an upper and lower right angle V-shaped grooves, each consisting of two flat surfaces adjoining at a right angle, one of which forms a slide unitside trackway surface 10 arranged in facing relation with the related rail-side trackway surface 9, leaving the other surface as a guide surface 17 with which end surfaces of rollers are brought into contact while they are travelling therealong.

On the outer sidewall of the trackway member 4, viz., the surface opposite to that facing the track rail member 1 (FIG. 2) are also formed an upper right angle V-shaped groove and a lower right angle V-shaped groove which in turn form the innerwall surfaces 14 of roller return passages.

Figure 7:
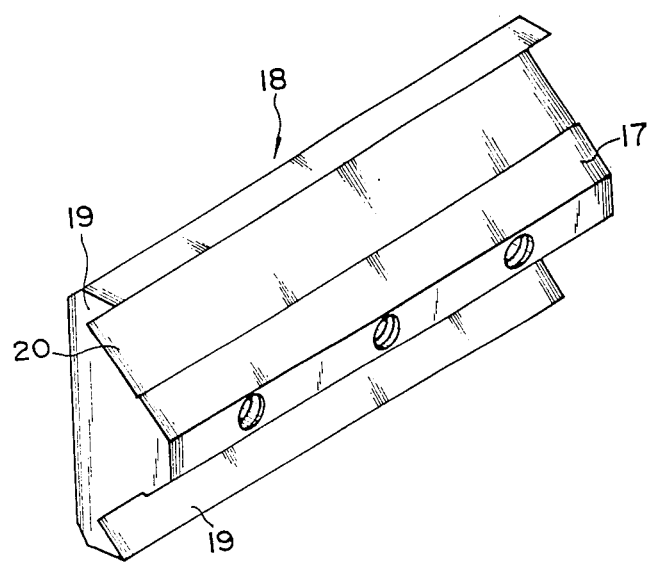
FIG. 7 is a perspective view of a sidewall retainer adapted to be fitted on to the inner sidewall of the trackway member.

As shown in FIG. 7, the sidewall retainer 18 to be fitted onto the inner sidewall of the trackway member 4 has a generally trapezoidal cross section and is provided with longitudinally extending roller retaining ledges 19 at and along the opposing bottom edges thereof, as well as a pair of relieved guide surfaces 17 extending in parallel with said roller retaining ledges 19, leaving a pair of longitudinally extending and laterally inclined surfades 20 therebetween so that the rollers travelling on and along the load-carrying trackway surfaces 10 can be effectively prevented from being subjected to skewing due to this end portions being kept in contact with and thus guided through by both the laterally inclined surfaces 20 and relieved guide surfaces 17 yet with reduced sliding resistance.

Onto the inner sidewall surface of the trackway member 4, viz., the surface opposite to that facing the track rail member 1 is fitted a sidewall retainer 18 (FIG. 7) as mentioned above, while on the other sidewall surface is fitted a return passage cover 15 thereby to form closed return passages in the slide unit (FIGS. 1 and 2), thus these three members, viz., sidewall retainer 18 (FIG. 7) the trackway member 4 (FIG. 6) and the return passage cover 15 (FIG. 1) are fastened together by means of a clamp bolt 23, thus forming a shorter and longer endless circulation passages in the slide unit.

In FIG. 3 is shown two endless circulation passages which are so arranged, as seen in a cross section of the slide unit, that their longitudinal axes cross each other at right angles, while as shown in FIG. 4, the longitudinal lengths of the two endless circulation passages differ from each other such that the longer circulation passage 12 emcompasses the shorter circulation passage 11 within the loop as shown in FIGS. 3 and 4, but the lengths of the load-carrying trackway surfaces of said two circulation passages are the same, which is the very feature of the present invention.

Figure 5:
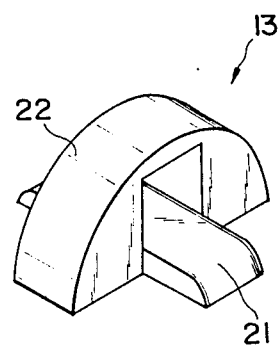
FIG. 5 is a perspective view of the direction changing passage spacer used in the formation of the endless circulation passages according to the present invention.

FIG. 5 shows a perspective view of a direction changing passageforming spacer 13 that is a part used for the formation of the abovementioned associated outside (longer) and inside (shorter) endless circulation passages 12 and 11 in such arrangement that their longitudinal axes cross each other at right angles as mentioned above.

Namely, as seen in a cross section of the slide unit, the traffic controlling of the rollers travelling along and through the direction changing passages 11' and 12' of the respective shorter and longer endless circulation passages 11 and 12 can be effected by means of a pair of spacers arranged at the longitudinally opposing ends of the associated two endless circulation passages 11 and 12, which are embedded within the sidewall panels 6 of the slide unit 2.

The direction changing passage-forming spacer has the shape of a low-height cylinder diametrically cut in half thereby having a semicircularly curved periphery with a rectangular-shaped tunnel formed therein at the generally center portion thereof, wherein a bridge member is snugly fitted at the lower part of said tunnel thus providing a curved periphery forming a longer direction changing innerwall surface 22 of the longer endless circulation passage 12 as well as a tunnel forming a shorter direction changing innerwall surface 21 of the shorter endless circulation passage 11, respectively, with the longitudinal axes of the two direction changing surfaces 21 and 22 crossing perpendicular to each other.

According to the present four track endless rectilinear motion guide unit, it is preferred that the longer direction changing passage 12' has a generally single arcuate shape, while the shorter direction changing passage 11' has a linear portion and arcuate portions connected to the opposite ends thereof but so long as shorter and longer endless circulation passages may be formed in such a particular arrangement as mentioned above, the shorter and longer direction changing passages may take any desired shapes.

Figure 8:
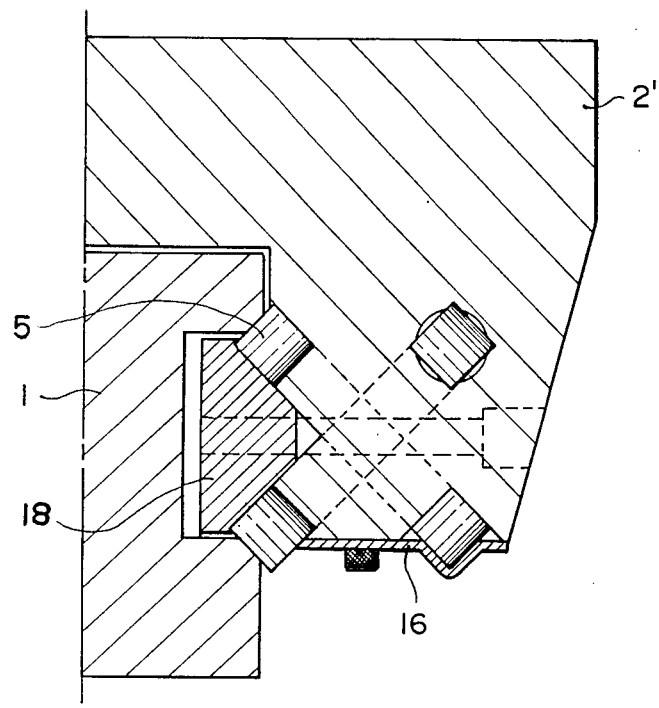
FIG. 8 is a front view in cross section of the second embodiment of the right half of the unit according to the present invention.

FIG. 8 is a cross section of a second embodiment of the present invention, particularly illustrating a slide unit structure wherein casing, trackway member, and roller return passage cover have been integrally formed, so that the constructional parts for assemblying a slide unit can be reduced in the number and the production error involved can be eliminated.

In the second embodiment as shown in FIG. 8, the return passage of the longer endless circulation passage can be simply and precisely formed by firstly forming within the body of slide unit an elongated throughbore having a circular cross section and then cutting right angle V-shaped grooves on and along the inner surface thereof at the four symmetrical portions in the cross section to form four shallow corner grooves by which the end faces of rollers are smoothly guided.

By forming the four tracks of endless circulation passages in such a special construction as mentioned above, the lengths of the respective load-carrying trackways of all the four endless circulation passages are made the same, so that the load capacities of the respective trackways can be made equally balanced.

Further, the lower and upper endless circulation passages to be formed in the slide unit can be much shortened in length thereby enabling to obtain a compact size slide unit.

Further, the direction changing passage is relatively simple in shape, thus it can be manufactured simply and at low costs on a mass production basis from synthetic resin according to conventional injection molding.

Consequently, the present four track-type endless rectilinear motion guide unit can find a wide range utility.

I claim:

1. A four track-type endless rectilinear motion guide unit comprising a track rail member having a generally I-shaped cross section, a slide unit having an inner recess having an inverted U-shaped cross section and slidably straddling with its recess on said track rail member, and a plurality of cylindrical rollers arranged in parallel with one another between the track surfaces of said track rail member and the track surfaces of said slide unit, said track rail member having, on each of the opposing elongated sidewalls, longitudinally extending groove with inclined surfaces being formed along the laterally opposing edge portions thereof so as to form lower and upper rail-side trackway surfaces, while on each of the opposing surfaces of the inner recess of said slide unit are formed lower and upper slide-unit side trackway surfaces, facing said lower and upper rail-side trackway surfaces respectively so that corresponding lower and upper trackway surfaces of the track rail member and the slide unit, respectively, form lower and upper load-carrying trackways between the track rail member and the slide unit, totalling four trackways in all, which form portions of endless circulation passages provided in said slide unit, the two endless circulation passages provided in each side of the slide unit being so arranged, as seen in a cross section thereof, that their longitudinal axes cross each other at right angles, while the longitudinal lengths of the two endless circulation passages differ from each other such that the longer circulation passage encompasses the shorter circulation passage within the loop, but the lengths of the load-carrying trackway surfaces of said two circulation passages are the same.

2. The four track-type endless rectilinear motion guide unit as claimed in the claim 1, wherein the longer endless circulation passage includes, as a portion, direction changing passage means having a generally single arcuate path.

3. The four track-type endless rectilinear motion guide unit as claimed in the claim 2 wherein the shorter endless circulation passage includes, as a portion, direction changing passage means having a linear portion and arcuate portions connected to the opposite ends thereof.

* * * * *